United States Patent
Berthoud et al.

(10) Patent No.: US 12,397,904 B2
(45) Date of Patent: Aug. 26, 2025

(54) AIRCRAFT LANDING GEAR ASSEMBLY COMPRISING A CAM SURFACE AND A LEAF SPRING, WHEREIN THE SECOND END REGION OF THE LEAF SPRING COMPRISES A CAM FOLLOWER

(71) Applicant: SAFRAN LANDING SYSTEMS UK LTD., Gloucester (GB)

(72) Inventors: Marcelo Berthoud, Gloucestershire (GB); Leandro Guimaraes Maia, Gloucestershire (GB); Jorge Juesas Portoles, Gloucestershire (GB)

(73) Assignee: SAFRAN LANDING SYSTEMS UK LTD., Gloucester (GB)

( * ) Notice: Subject to any disclaimer, the term of this patent is extended or adjusted under 35 U.S.C. 154(b) by 0 days.

(21) Appl. No.: 18/567,330

(22) PCT Filed: Jun. 27, 2022

(86) PCT No.: PCT/EP2022/067492
§ 371 (c)(1),
(2) Date: Dec. 5, 2023

(87) PCT Pub. No.: WO2023/274917
PCT Pub. Date: Jan. 5, 2023

(65) Prior Publication Data
US 2024/0270373 A1    Aug. 15, 2024

(30) Foreign Application Priority Data
Jun. 28, 2021 (EP) .................................. 21181982

(51) Int. Cl.
*B64C 25/12* (2006.01)
*B64C 25/20* (2006.01)
*B64C 25/26* (2006.01)

(52) U.S. Cl.
CPC .............. *B64C 25/12* (2013.01); *B64C 25/20* (2013.01); *B64C 25/26* (2013.01)

(58) Field of Classification Search
CPC .......... B64C 25/20; B64C 25/26; B64C 25/12
See application file for complete search history.

(56) References Cited

U.S. PATENT DOCUMENTS

| 2,224,481 A | 12/1940 | Laraque |
| 2009/0057485 A1 | 3/2009 | Seror-Goguet et al. |

(Continued)

FOREIGN PATENT DOCUMENTS

| EP | 1988015 A1 | 11/2008 |
| EP | 3069993 A1 | 9/2016 |

(Continued)

OTHER PUBLICATIONS

Decision to grant received for European Patent Application No. 21181982.6, mailed on Mar. 7, 2024, 2 pages.

(Continued)

*Primary Examiner* — Joshua D Huson
*Assistant Examiner* — Shanna Danielle Glover
(74) *Attorney, Agent, or Firm* — WOMBLE BOND DICKINSON (US) LLP

(57) ABSTRACT

An aircraft landing gear assembly including a first landing gear element movably coupled relative to a second landing gear element to pivot about a pivot axis; a cam surface defined by the second landing gear element; and a leaf spring having a first end region and a second end region, the first end region of the leaf spring being coupled to the first landing gear element including a cam follower arranged in moving contact with the cam surface such that the cam follower moves from a first region to a third region via a second region, wherein the cam surface is shaped such that a distance between the pivot axis and the cam surface (Continued)

increases between the first region and the second region and the distance between the pivot axis and the cam surface varies between the second region and the third region of the cam.

10 Claims, 14 Drawing Sheets

(56) References Cited

U.S. PATENT DOCUMENTS

| | | |
|---|---|---|
| 2013/0181091 A1 | 7/2013 | Evans et al. |
| 2015/0203192 A1* | 7/2015 | Slanker .................. B64C 25/12 244/102 R |
| 2016/0137295 A1* | 5/2016 | Bond ...................... B64C 25/30 244/102 A |
| 2016/0272305 A1* | 9/2016 | Schmidt ................. B64C 25/10 |
| 2017/0158315 A1 | 6/2017 | Slanker |
| 2018/0092761 A1 | 4/2018 | Rouse et al. |

FOREIGN PATENT DOCUMENTS

| | | |
|---|---|---|
| EP | 3300699 A1 | 4/2018 |
| GB | 2498208 A | 7/2013 |
| WO | 2023/274917 A1 | 1/2023 |

OTHER PUBLICATIONS

European Search Report and Search Opinion received for EP Patent Application No. 24168000.8, mailed on Jun. 21, 2024, 7 pages.
Communication about intention to grant a European patent received for European Application No. 21181982.6, mailed on Nov. 8, 2023, 6 pages.
European Search Report and Search Opinion received for European Application No. 21181982.6, mailed on Dec. 17, 2021, 7 pages.
International Search Report and Written Opinion received for PCT Patent Application No. PCT/EP2022/067492, mailed on Sep. 16, 2022, 11 pages.

* cited by examiner

--Prior Art--

--Prior Art--

--Prior Art--

--Prior Art--

--Prior Art--

--Prior Art--

AIRCRAFT LANDING GEAR ASSEMBLY COMPRISING A CAM SURFACE AND A LEAF SPRING, WHEREIN THE SECOND END REGION OF THE LEAF SPRING COMPRISES A CAM FOLLOWER

BACKGROUND TO THE INVENTION

An aircraft landing gear assembly is generally movable between a deployed condition, for take-off and landing, and a stowed condition for flight.

An actuator is provided for moving the landing gear between the deployed condition and the stowed condition. This actuator is known in the art as a retraction actuator, and more than one can be provided. A retraction actuator can have one end coupled to the airframe and another end coupled to the main strut such that extension and retraction of the actuator results in movement of the main strut between the deployed and stowed conditions.

A brace or stay is generally provided to support the orientation of the main strut when the landing gear is in the deployed condition. A stay generally includes a two bar linkage that can be unfolded to assume a generally aligned, over centre condition in which the stay is locked to inhibit movement of the main strut. When the stay is broken, it no longer reacts movement of the main strut and the main strut can be moved by the retraction actuator to the stowed condition. Some main landing gear assemblies include a pair of stays coupled to a common main strut.

A lock link is generally provided in conjunction with each stay to maintain the stay in the locked condition. A lock link generally includes a two bar linkage that can be unfolded to assume a locked over centre condition to inhibit movement of the stay. The lock link must be broken to enable the stay to be folded, thereby permitting the main strut to be moved by the retraction actuator towards the stowed condition.

It is common for a landing gear assembly to be arranged to move towards the deployed condition in the event of a failure of the retraction actuator. Initially, the landing gear assembly will move by way of gravity, and in doing so the stay is forced to move towards the locked condition. One or more down lock springs are generally provided to assist in moving the landing gear assembly to the deployed condition and locking it in that state by moving the lock link over centre. Down lock springs also inhibit the lock link accidentally being unlocked.

A down lock spring is generally a metal coil spring, which can be coupled between the lock link and another part of the landing gear assembly, such as an arm of the stay assembly. However, more recent developments in landing gear assemblies have seen the use of fibre composite leaf springs, such as that described in European Patent Publication No. EP3069993. Fibre composite leaf springs can deflect sufficiently to accommodate articulation movement of the lock link as the landing gear assembly moves between the deployed and stowed conditions. The fibre composite leaf spring has various advantages over conventional metal coil down lock springs; for example, the leaf spring can have a low profile in comparison to a coil spring, reducing the likelihood of impact damage, in addition to being less susceptible to vibratory loading.

The present inventors have devised an improved landing gear assembly that can have one or more of the following advantages relative to known landing gear assemblies: spring lifespan; spring load profile; and/or weight of the landing gear assembly.

SUMMARY OF INVENTION

According to a first aspect of the invention, there is provided an aircraft landing gear assembly comprising: a first landing gear element movably coupled relative to a second landing gear element to pivot about a pivot axis between a first condition and a second condition; a cam surface spatially fixed with respect to the pivot axis; and a leaf spring having a first end region and a second end region, the first end region of the leaf spring being coupled to the first landing gear element to move with the first landing gear element and the second end region of the leaf spring comprising a cam follower arranged in moving contact with the cam surface such that the cam follower moves from a first region of the cam surface to a third region of the cam surface via a second region of the cam surface as the first landing gear element pivots about the pivot axis from the first condition to the second condition, bending the leaf spring, wherein the cam surface is shaped, contoured, arranged and/or configured such that a distance between the pivot axis and the cam surface increases between the first region and the second region to define a first gradient and a distance between the pivot axis and the cam surface varies between the second region and the third region of the cam surface to define a second gradient, the second gradient being less steep than the first gradient.

Thus, the landing gear assembly according to the first aspect includes a leaf spring which defines a cam follower acting on a cam surface arranged to provide a spring load which is not greater when the landing gear is stowed in comparison to an operational condition.

When in the operational condition, the spring is arranged to urge the first landing gear element to assume the first condition, which can for example equate to a landing gear down-lock engaged operational condition. In this manner, spring fatigue can be reduced, thereby increasing the lifespan of the leaf spring and reducing maintenance requirements. A further advantage relates to the assembly method, which can be easier to perform when compared to coil springs that require large and complex tools for installation.

The landing gear assembly can comprise: a main strut arranged to be movably coupled to an aircraft to move between a deployed condition and a stowed condition; a side stay comprising a first stay member pivotally coupled to a second stay member, the first stay member being pivotally coupled to the strut and the second stay member being arranged to be pivotally coupled to an anchor point so as to be movable between a locking condition in which the side stay members are generally aligned to react a force attempting to move the main strut from the deployed condition towards the stowed condition, and a passive condition in which the side stay permits the main strut to be moved from the deployed condition towards the stowed condition; and a lock link comprising a first lock link member pivotally coupled to a second lock link member, the first lock link member being pivotally coupled to the strut and the second stay member being pivotally coupled to side stay so as to be movable between a locking condition in which the lock link members are generally aligned to react a force attempting to move the side stay from the locking condition towards the passive condition, and a passive condition in which the lock link permits the side stay to be moved from the locking condition towards the passive condition, wherein the first landing gear element comprises the first lock link member or the second lock link member.

With such an arrangement, the leaf spring can be mounted on one of the lock link arms, which enables the cam surface to be defined relative to a pivot pin mounting of the lock link.

The first landing gear element can comprises the first lock link member and the first lock link member can be pivotally coupled to the strut via a cardan pin, the second landing gear element comprising the cardan pin.

With such an arrangement, the head of the cardan pin can define the cam surface, reducing the weight of the landing gear assembly and simplifying its construction.

The first landing gear element can comprise the first lock link member and the second landing gear element can comprise the second lock link member, the cam surface being defined by an end region of the second lock link member via which the second lock link member is pivotally coupled to the first lock link member.

The follower can be defined by an end fitting coupled at the second end region of the leaf spring, the end fitting having a first end region defining a mounting formation via which the end fitting is coupled to the leaf spring.

With such an arrangement, the end fitting can form a sacrificial part such that the spring is not worn through contact with the second element, the end fitting being removably coupled to the spring to enable replacement.

The end fitting can be formed of a relatively hard or malleable material in comparison to the spring; for example, the end fitting can be formed from a metallic or hard plastics material.

The follower can comprise a roller mounted on the end fitting to rotate about a roller axis which is parallel with the pivot axis of the first landing gear element.

With such an arrangement, friction between the follower and cam can be reduced.

A second end region of the end fitting can define the cam follower, wherein a region of the end fitting between the first and second end regions defined a relatively narrow waist region in comparison to another part of the end fitting, where an outer surface of the end fitting is offset from a central axis of the end fitting less than a distance by which the cam follower is offset from the central axis.

With such an arrangement, the follower can move along the third region of the cam surface without fouling the second portion of the cam surface; for example, where the second gradient is zero or negative, the waist region can receive part of the second portion of the cam surface as the follower moves to the third region of the cam surface, without the cam surface contacting any part of the end fitting other than the cam follower.

The third region of the cam surface can be defined as a curved surface.

With such an arrangement, the leaf spring can transition smoothly between load profiles.

The second gradient can be zero or negative.

With such arrangements, the load applied by the leaf spring to the first landing gear element does not increase and can in some embodiments be reduced when the landing gear is stowed and the cam follower is in contact with the third region of the cam surface, in comparison to when the gear is deployed and the cam follower is in contact with the first region of the cam surface.

The landing gear assembly can comprise a second leaf spring and a second cam surface, the second leaf spring having a first end region and a second end region, the first end region of the second leaf spring being coupled to the first landing gear element to move with the first landing gear element and the second end region of the second leaf spring comprising a second cam follower arranged in moving contact with the second cam surface such that the second cam follower moves from a first region of the second cam surface to a third region of the second cam surface via a second region of the second cam surface as the first landing gear element pivots about the pivot axis between the first condition and the second condition, bending the second leaf spring, wherein the second cam surface is shaped, contoured, arranged and/or configured such that a distance between the pivot axis and the second cam surface increases between the first region and the second region to define a third gradient and a distance between the pivot axis and the cam surface varies between the second region and the third region of the second cam surface to define a fourth gradient, the third gradient being less steep than the fourth gradient.

With such an arrangement, multiple leaf springs and cam surfaces can be provided. Any optional feature of the first leaf spring and cam can be applied to the second leaf spring and cam. Likewise, there can be more than two leaf spring and cam surface arrangements as described above.

The leaf springs can be mounted in parallel on the first landing gear element and the cam surfaces can be located in parallel, so as to define a symmetrical arrangement on either side of the longitudinal axis or vertical plane of the first landing gear element.

With such an arrangement, multiple leaf springs and cam surfaces can be provided to act between the same two parts of the landing gear assembly, with balanced spring loads in use for additional effort or safety.

The leaf spring can comprise a fibre composite leaf spring. Alternatively, the leaf spring can comprise a metal leaf spring.

BRIEF DESCRIPTION OF THE DRAWINGS

Embodiments of the invention will now be described, strictly by way of example only, with reference to the accompanying drawings, of which:

FIG. 5 is a diagram of part of the lock link of the landing gear assembly of FIG. 4, showing the cam surface side on;

FIG. 10 is a diagram of the portion of the landing gear assembly of FIG. 9 showing the cam profile side on.

DESCRIPTION OF EMBODIMENTS

Figure 1:
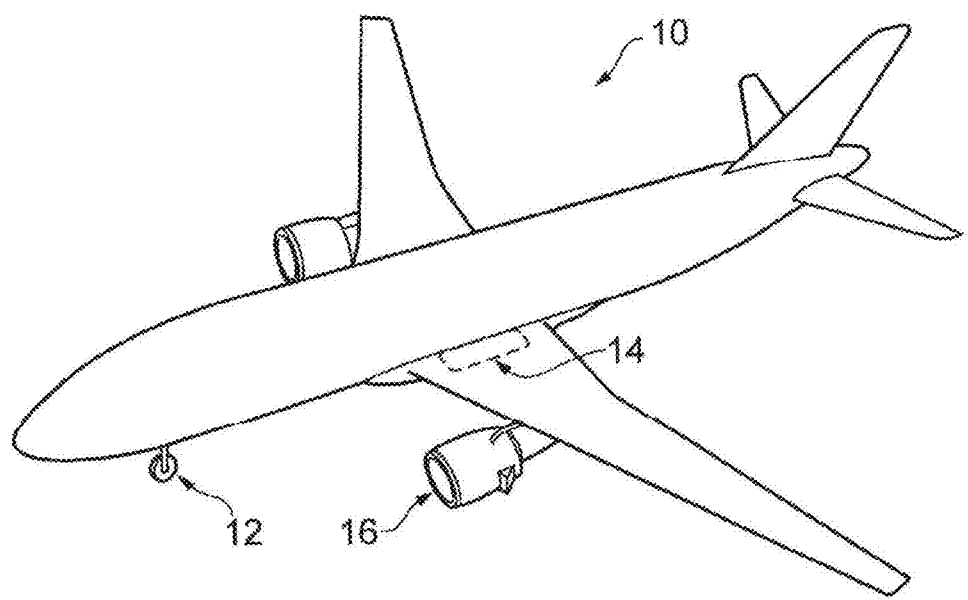
FIG. 1 is a prior art diagram of an aircraft.

FIG. 1 is a diagram of an aircraft 10. The aircraft 10 includes assemblies such as a nose landing gear 12, main landing gear 14 and engines 16. Other aircraft assemblies will be apparent to the skilled person. An aircraft assembly can be a group of interconnected parts which are arranged to be fitted to one or more other aircraft assemblies as a unit. The term aircraft as used herein includes aeroplanes, helicopters, UAVs and the like.

Referring now to FIGS. 2a to 2e, an aircraft assembly, namely an aircraft landing gear assembly, is shown generally at 14. The landing gear assembly 14 includes a foldable stay 18, a lock link 20 and a down lock spring assembly 22 mounted to the stay 18 and arranged to urge the lock link 20 to assume a locked state. The landing gear assembly also includes a main shock absorber strut 24, comprising a main strut 26 and a sliding tube 28, as well as a wheel and brake assembly 30.

The aircraft landing gear assembly is movable between a deployed condition, for take-off and landing, and a stowed condition for flight. An actuator (not shown) is provided for moving the landing gear between the deployed condition and the stowed condition. This actuator is known in the art as a retraction actuator, and more than one can be provided. A retraction actuator can have one end coupled to the airframe and another end coupled to the main strut such that extension and retraction of the actuator results in movement of the main strut between deployed and stowed conditions.

Figure 2A:
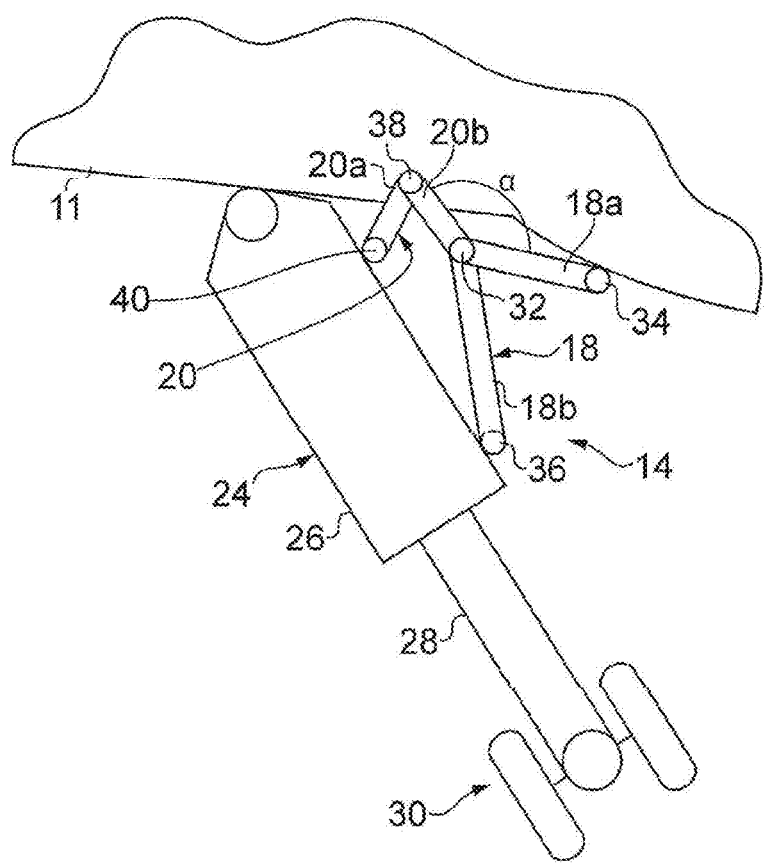
FIGS. 2*a* to 2*e* are prior art diagrams of a landing gear assembly.
Figure 2B:
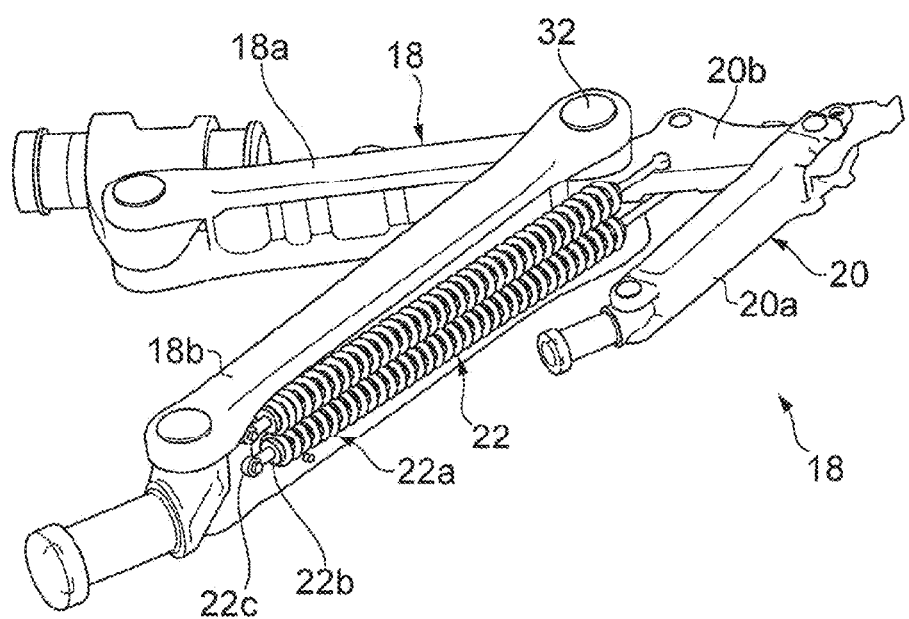
Figure 2C:
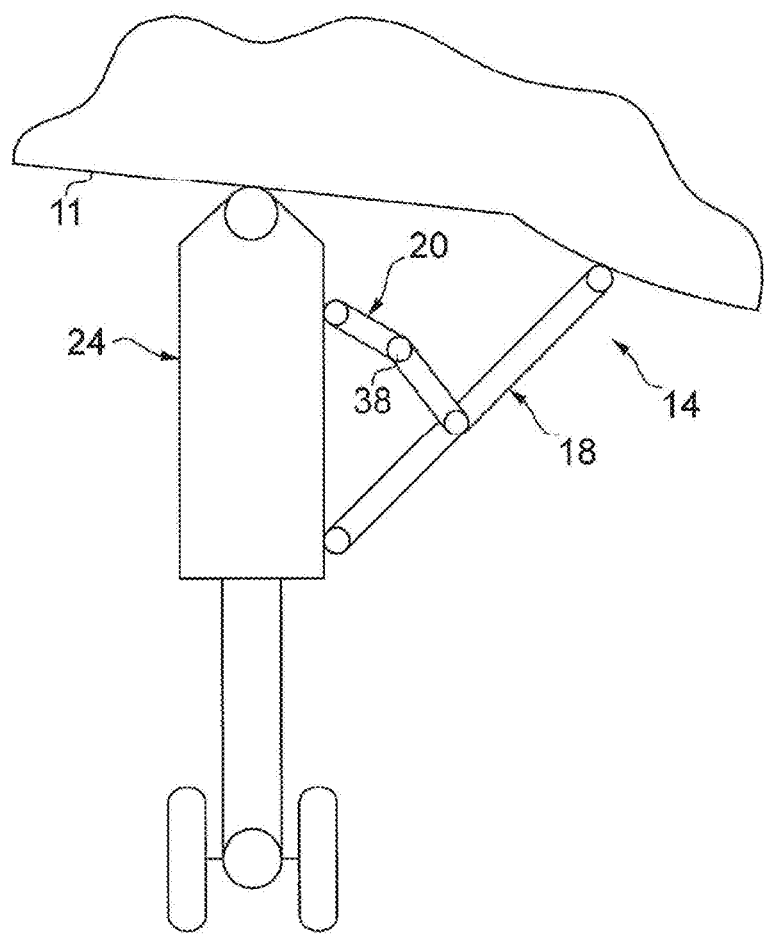

The stay 18 serves to support the orientation of the main strut 26 when the landing gear is in the deployed condition. The stay 18 generally includes a two bar linkage that can be unfolded to assume a generally straight or aligned, over centre condition in which the stay 18 is locked to inhibit movement of the main strut, as shown in FIGS. 2c and 2e. When the stay is broken, it no longer prevents pivotal movement of the main strut 26 and the main strut 26 can be moved by the retraction actuator towards the stowed condition, as shown in FIG. 2a. During flight the stay 18 is arranged in the folded condition, while during take-off and landing the stay 18 is arranged in the generally straight or aligned condition. Some main landing gear assemblies include a pair of stays coupled to a common shock absorbing strut.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b can therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs pivotally coupled to a lug of a connector 36 which in turn is pivotally coupled to the main strut 26.

The lock link 20 has an elongate upper link arm 20a having a lower end pivotally coupled to an upper end of an elongate lower link arm 20b via a pivot pin 38. The link arms 20a, 20b can therefore pivotally move relative to one another about the pivot pin 38. An upper end of the upper link arm 20a defines a pair of lugs that are pivotally coupled to a lug of a connector 40 which in turn is pivotally coupled to the main strut 26. A lower end of the lower link arm 20b defines a lug that is pivotally coupled to lugs of the stay arms 18a, 18b via the pivot pin 32. Lugs of the upper stay arm 18a are in this example disposed between the lugs of the lower stay arm 18b and the lugs of the lower link arm 20b.

Figure 2D:
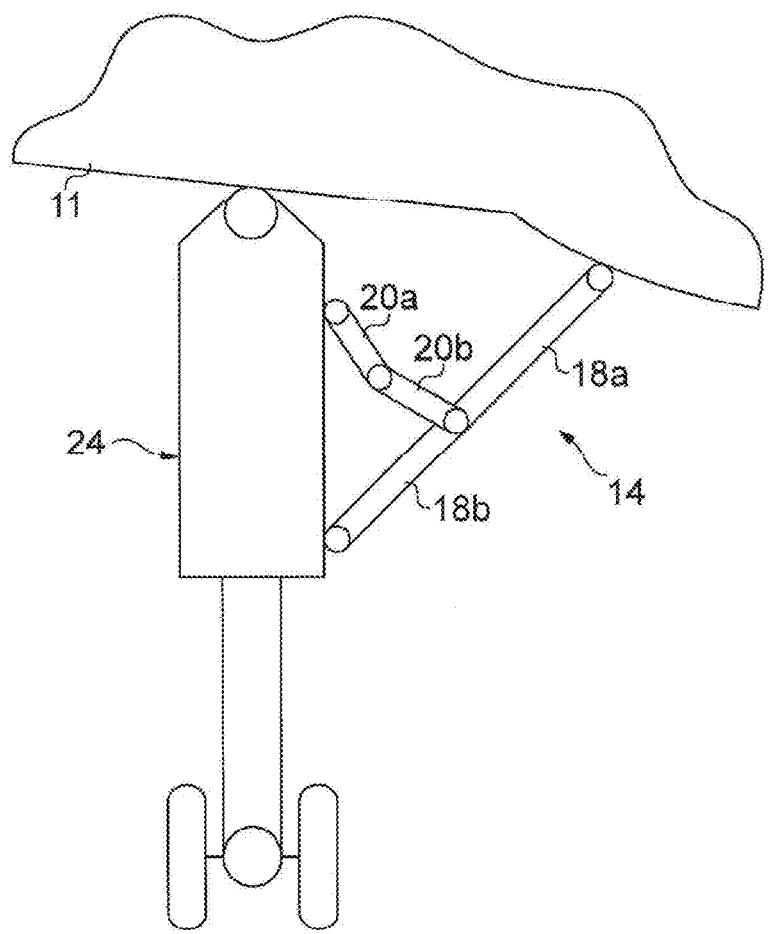
Figure 2E:
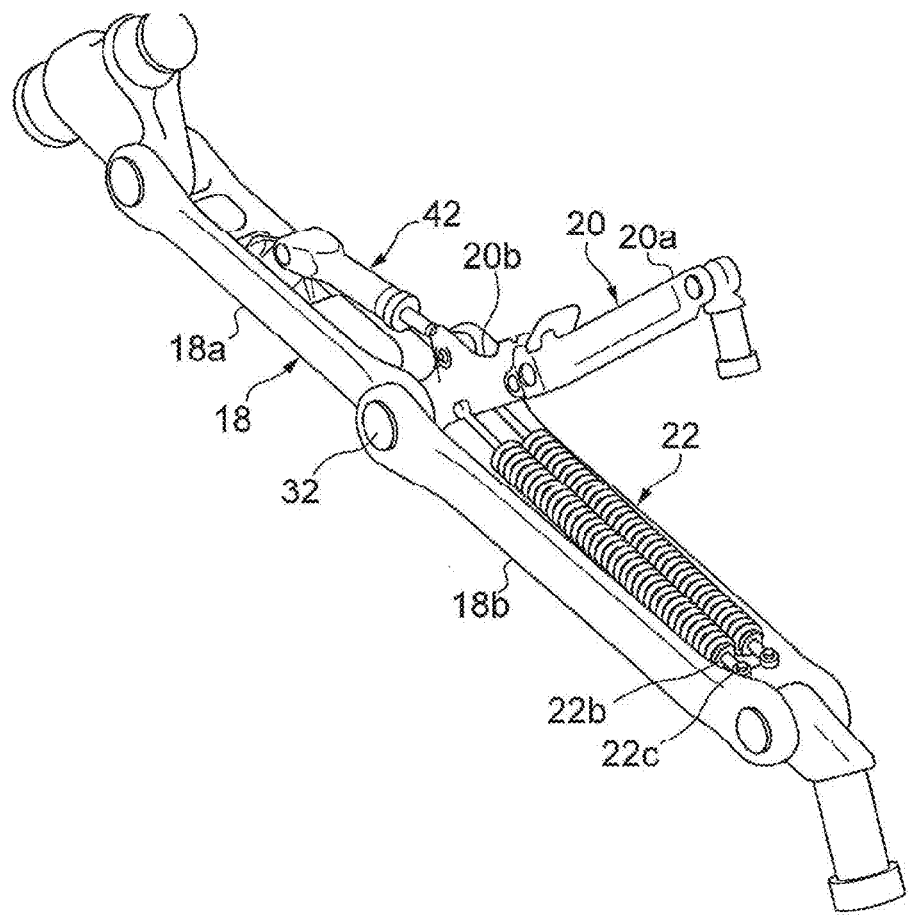

When the lock link 20 is in the locked condition, as illustrated in FIGS. 2d and 2e, the upper and lower link arms 20a, 20b are generally longitudinally aligned or coaxial, and can be 'over-centre', such that the lock link 20 is arranged to oppose a force attempting to fold the stay 18, so as to move the landing gear assembly from the deployed condition towards the stowed condition. The lock link 20 must be broken to enable the stay 18 to be folded, thereby permitting the main strut 26 to be moved by the retraction actuator towards the stowed condition.

One or more down lock springs 22 are generally provided to assist in moving the landing gear assembly to the deployed condition and locking it in that state by making the lock link. Down lock springs 22 also inhibit the lock link accidentally being unlocked. Down lock springs 22 are generally metal coil springs, which can be coupled between the lock link and another part of the landing gear assembly, such as an arm of the stay assembly, as shown in FIGS. 2b and 2e.

The spring assembly 22 is arranged to bias the lock link 20 towards the locked condition by way of spring tension. A distal end of the spring 22a is coupled to the lower stay arm 18b via a lower engagement formation 22b which in turn is coupled to an anchor point defined by the lower connector 22c.

The coil spring of the spring assembly 26 is at its shortest when the landing gear assembly is in the deployed condition, as shown in FIG. 2e, and at its longest when the landing gear assembly approaches the stowed condition, as shown in FIG. 2b. As the landing gear assembly is retracted towards the stowed condition, the spring of each spring assembly extends, resulting in increased spring load and torsional stress.

Referring to FIG. 2e, a lock stay actuator 42 is coupled between the upper stay arm 18a and lower link arm 20b and arranged to pivotally move the link arms 20a, b so as to 'lock' and 'unlock' the lock link 20, as illustrated in FIG. 2c. The actuator 42 can break the lock link 20 against the down lock spring bias, allowing the landing gear assembly to be folded and stowed as described previously.

As will be appreciated from the above, various aircraft landing gear assemblies include a first part which is movable relative to a second part. With such an arrangement, a spring can be present to urge the first part into a predetermined position relative to the second part, such as for the lock link 20 mentioned above.

Figure 3A:
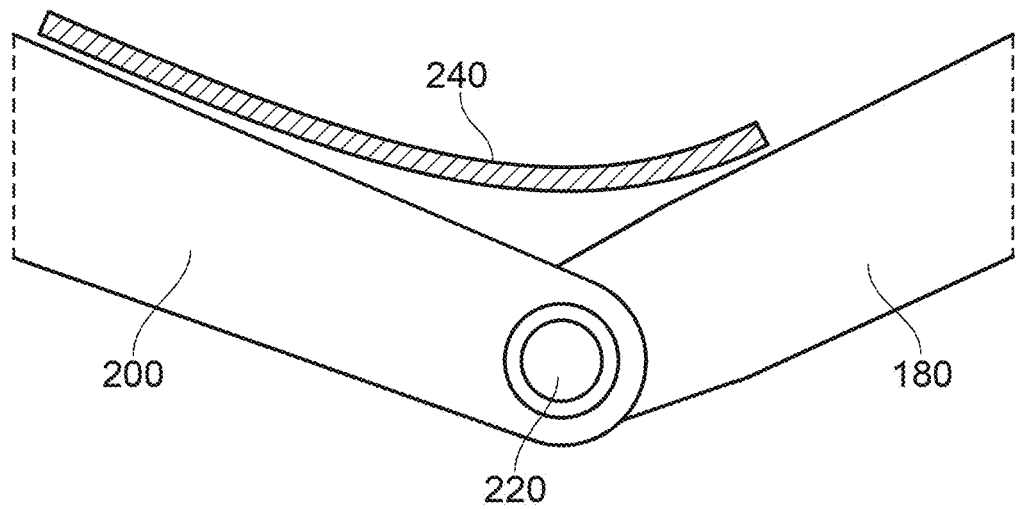
FIGS. 3*a* to 3*b* are prior art diagrams of a portion of a landing gear assembly.
Figure 3B:
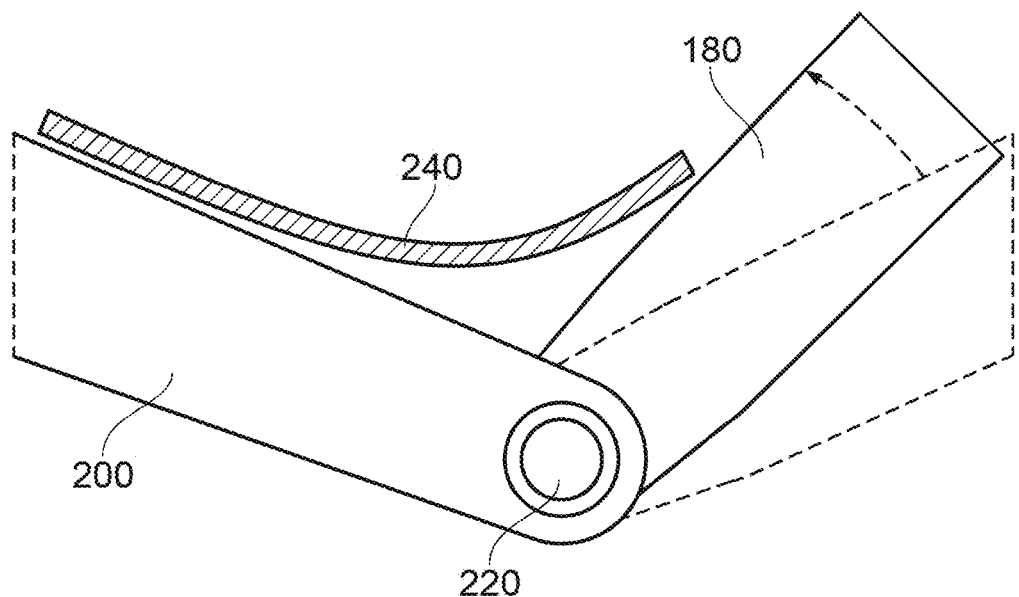

FIGS. 3a and 3b show part of a landing gear assembly, in which a first landing gear element 180 is movably coupled to a second landing gear element 200. As will be appreciated, the first and second landing gear elements shown in FIGS. 3a and 3b could be any movably coupled elements described in relation to FIGS. 2a-e, and the movement of the landing gear elements can be controlled by an actuator, such as described above. For example, the first landing gear element 180 can be one of a lock link or side stay, and the second landing gear element can be the other of a lock or side stay, as per the arrangement in e.g. FIG. 2b. The terms first and second are used merely to differentiate the elements and any aspect described in reference to one is equally applicable to the other. The first and second landing gear elements 180, 200 can be movable relative to one another along a movement plane into different conditions. In the example arrangement shown in FIGS. 3a and 3b, the first landing gear element 180 is pivotally coupled to the second landing gear element 200 at pivot point 220 (e.g. via a pin joint) and can move into different relative positions. Where, for instance, the first and second landing gear elements are pivotally coupled via a pin joint, the movement plane can be perpendicular to the direction of the pin of the pin joint. Each relative position, or condition, defines an angle between the first and second landing gear elements 180, 200. FIG. 3b illustrates a pivotal movement of the first landing gear element relative to the second landing gear element from a first condition (shown in FIG. 3a, and by the dashed line in FIG. 3b) to a second condition (shown in FIG. 3b). Of course, the relative movement can involve movement of either or both of the landing gear elements. In the second condition, shown in FIG. 3b, the angle between the landing gear elements is smaller than that in the first condition.

A leaf spring 240 is arranged between the first landing gear element 180 and the second landing gear element 200, such that as the first landing gear 180 element moves relative to the second landing gear element 200, the spring flexes. As shown in FIGS. 3a and 3b, moving the first landing gear element 180 from the first condition to the second condition applies a force to the spring 240 causing it to bend in a bending plane corresponding to the movement plane. Equally, the restorative force of the spring will act to bias the first and second landing gear elements 180, 200 apart, i.e. to increase the angle between the landing gear elements. In this way, the leaf spring 240 can bias the first landing gear element 180 into the first condition. The skilled person will appreciate how, for the operation described in relation to FIGS. 2a-e, the first condition can be the over-centre condition of the lock link.

The present inventors have devised an improved aircraft landing gear assembly utilising a leaf spring, which has one or more of the following advantages relative to the example shown in FIGS. 3a and 3b: spring lifespan; spring load profile; and/or weight of the landing gear assembly. In one example, the spring-link design shown in FIGS. 3a and 3b can be limited in its ability to generate load during downlock. Embodiments of the invention can optimise and synchronise kinematic movement of the landing gear with deflection of the down-lock spring. In embodiments of the invention the leaf spring does not store a high level of energy when in the stowed position. Due to the shorter length and higher stiffness that can be utilised in comparison to arrangements using a coil spring, the leaf spring in embodiments of the invention can be less susceptible to generating noise and vibration than a coil spring when interacting with the airflow.

Figure 4:
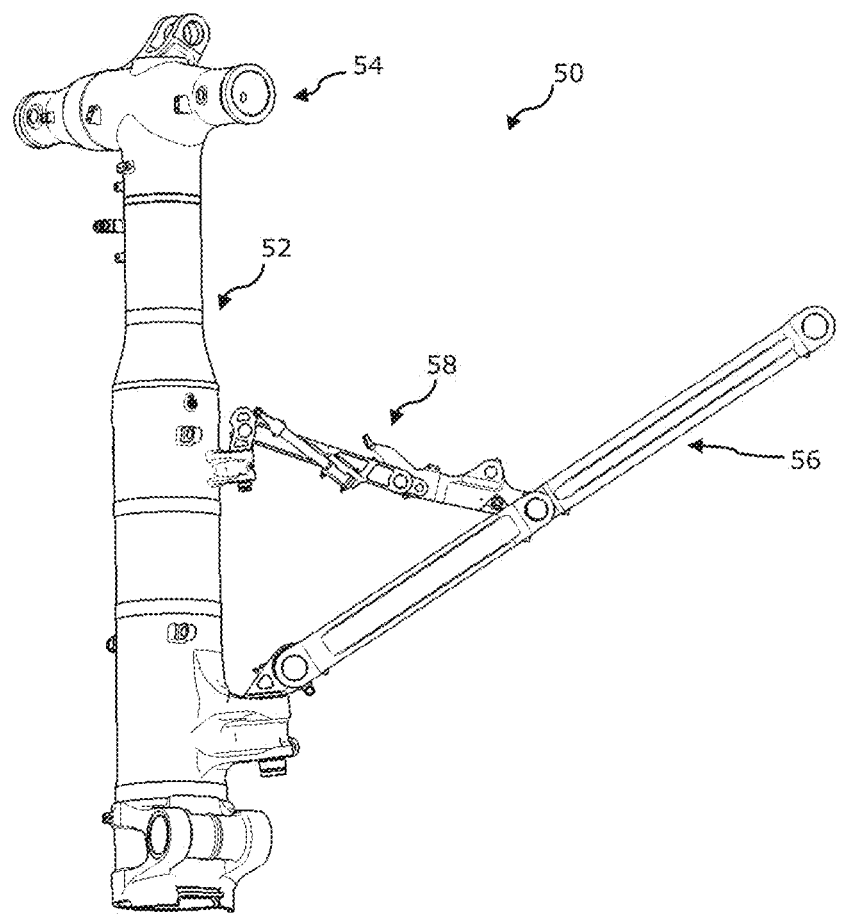
FIG. 4 is a diagram of a portion of a landing gear assembly according to an embodiment of the invention.

FIG. 4 is a diagram of an aircraft landing gear assembly 50 according to an embodiment of the present invention.

The landing gear assembly 50 is similar to the landing gear assemblies of FIGS. 2a to 3b. For example, the landing gear assembly 50 has conventional components such as a shock absorbing strut comprising an outer cylinder 52 arranged to slidably house a lower cylinder (not shown) which carries one or more ground contacting assemblies such as wheel assemblies. The upper end of the outer cylinder defines a mounting bearing 54 via which the landing gear assembly is arranged to be coupled to an aircraft such as that shown in FIG. 1. A two bar, folding side stay 56 is provided to maintain the gear in the deployed condition and a two bar, folding lock link 58 is provided to maintain the side stay 56 in an over-centre, locked condition. A retraction actuator (not shown) can be provided to raise and lower strut 52 and a lock stay actuator (not shown) can be provided to unlock the lock link 58.

For brevity, the following description will focus on the differences between the landing gear assembly 50 and the known landing gear assemblies of FIGS. 2a to 3b.

Figure 5:
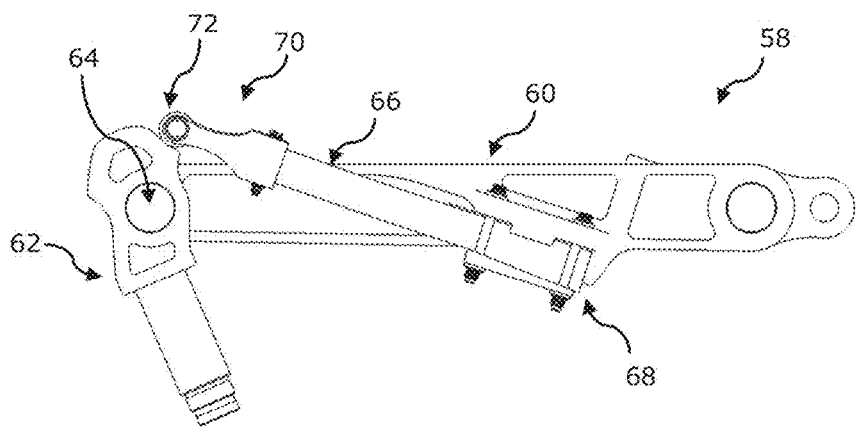

Referring additionally to FIG. 5, the aircraft landing gear assembly 50 has a first landing gear element movably coupled relative to a second landing gear element to pivot about a pivot axis between a first condition and a second condition.

In the illustrated embodiment the first landing gear element 60 is the upper lock link member 60 of the lock link 58 and the second landing gear element is a cardan pin 62, via which the upper lock link member 60 is movably coupled to the outer cylinder 52. The upper lock link member 60 is pivotally coupled to the cardan pin 62 via a pivot pin 64 to enable the lock link 58 to fold and unfold between the locked and passive conditions.

A leaf spring 66 is provided to bias the lock link 58 to assume the locked condition in a similar manner to the spring shown in FIGS. 3a and 3b. However, in this embodiment the leaf spring 66 is mounted to the upper lock link member 60 and arranged to act on the cardan pin 62.

More specifically, a first end of the leaf spring 66 is mounted in a static fitting 68 such that the first end generally cannot move relative to the upper lock link member 60. The static fitting can for example define clamping surfaces drawn together by mechanical fixings such as screws or bolts to hold the first end of the spring 66. The first end of the spring 66 can be outwardly tapered to define a wedge to inhibit the spring 66 being drawn from the static fitting 68 in use.

A second end of the spring 66 is provided with an end fitting 70 which defines a cam follower arranged to contact the head of the cardan pin 62 as the landing gear assembly moves between deployed and retracted conditions. The end fitting 70 can be mechanically coupled to the spring 66 by a nut and bolt arrangement or the like to provide a removable coupling, or can for example be bonded to the spring 66.

In this embodiment the cam follower is defined by a roller 72 mounted at the free end of the end fitting 70. The roller 72 can be formed of any conventional roller materials, preferably a material that is galvanically compatible with the cardan pin 62; in one example, the cardan pin 62 can be formed from stainless steel with a suitable surface coating and the roller can be formed from stainless steel.

In other embodiments, an end fitting can define a smooth surface to serve as a cam follower. In such embodiments, the end fitting or just the smooth surface of it can be formed of any suitable material that is galvanically compatible with the cardan pin 62; in one example, the cardan pin 62 can be formed from stainless steel with a suitable surface coating and the smooth surface can be formed from stainless steel.

Figure 6:
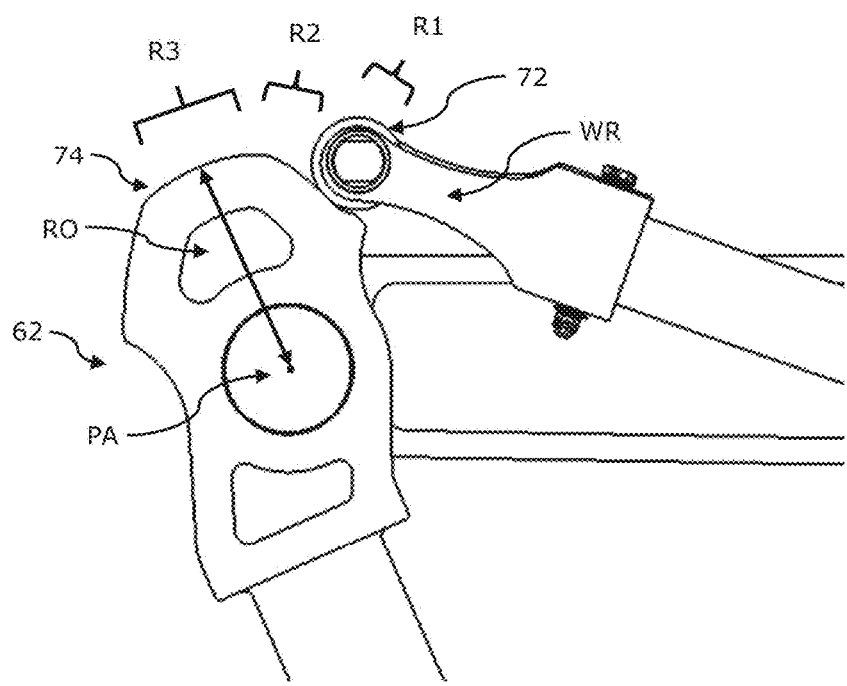
FIG. 6 is a diagram focusing on the cam surface and rolling end fitting of the leaf spring.

Referring additionally to FIG. 6, the head of the cardan pin 62 defines a cam surface 74. The cam surface 74 is spatially fixed with respect to the pivot axis PA in the sense that the radial offset RO between a particular point on the cam surface 74 and the pivot axis PA remains constant as the landing gear moves between deployed and stowed conditions.

The leaf spring 66 is coupled to the upper lock link member 60 to move with the upper lock link member 60. The mounting orientation of the leaf spring 66 is such that the longitudinal axis of the leaf spring 66 is skew with respect to the longitudinal axis of the upper lock link member 60 such that the roller 72 is positioned in contact with the cam surface 74 at the head of the cardan pin 62.

Thus, as the upper lock link member 60 pivots about the pivot axis PA relative to the cardan pin 62 due to the landing gear moving from the deployed condition to the stowed condition, the roller 72 moves from a first region R1 of the cam surface 74 to a third region R3 of the cam surface 74 via a second region R2 of the cam surface 74, bending the leaf spring 66 as it moves along the first region R1 towards the second region R2.

Figure 7:
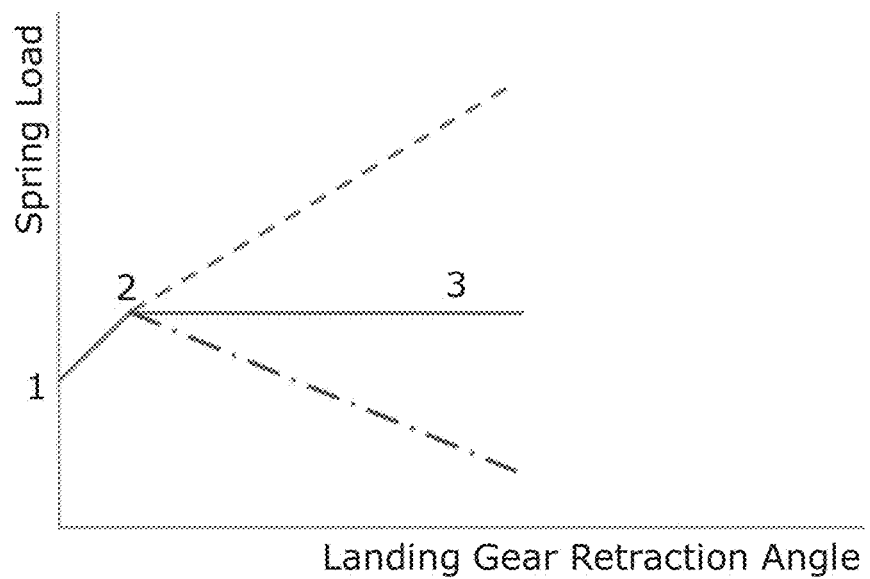
FIG. 7 is a graph plotting spring load vs. landing gear retraction angle for a known landing gear assembly, a desirable curve and a landing gear assembly according to an embodiment of the invention.

Referring additionally to FIG. 7, the cam surface 74 is shaped such that a radial offset distance RO between the pivot axis PA and the cam surface 74 increases between the first region R1 and the second region R2 to define a first gradient, shown between points 1 and 2 in the solid line plot of leaf spring load vs. landing gear retraction angle, which can refer to the angle of the main strut relative to the fully deployed orientation. The radial offset distance RO varies between the second region R2 and the third region R3 of the cam surface to define a second gradient, shown between point 2 and point 3 in FIG. 7. The second gradient is less steep than the first gradient.

Thus, the spring load is not greater when the landing gear is stowed in comparison to an operational condition in which the spring is arranged to urge the lock link to assume the locked, over centre condition. In this manner, spring fatigue can be reduced, thereby increasing the lifespan of the leaf spring and reducing maintenance requirements. In contrast, in known spring arrangements, spring load can continuously increase with landing gear retraction angle, as shown by the dashed line in FIG. 7.

With the cam profile, it is possible to easily increase the effective arm where necessary and to relieve the spring deformation when the gear is retracted, in the stowed condition. This has the potential to improve fatigue life and stress corrosion conditions. The cam surface can for example be configured such that the radial offset decreases between the second region R2 and the third region R3 to reduce the spring load when the landing gear is stowed, as illustrated in the dot-dash line in FIG. 7.

When the landing gear moves from the stowed condition to the deployed condition, the upper lock link member 60 rotates in relation to the cardan pin 62. This relative rotational movement is used to lock the mechanism by the addition of a moment load using existing landing gear components assisted by a cam surface, a roller and a spring. This concept takes advantage of the energy stored in the spring as it retracts, by the roller, over a cam surface machined on the top of cardan pin, generating a down locking moment. It also has the ability to tailor the spring deflection (and hence load) throughout deployment to more closely match a given down-locking requirements curve. In terms of performance, a leaf spring is able to achieve high levels of load with small deformations, especially when compared to a coil spring.

In order to have the landing gear positioned and locked, there is a performance requirement that the down locking mechanism must meet. This requirement is defined as a moment that the mechanism must generate when the upper lock link member 60 rotates in relation to the cardan pin 62. This moment, in combination with the effective arms, defines the required spring force. Once the spring force is defined, it is possible to define the contact stress between the cam 74 and the roller 72. The stress is influenced by the minimum radius of the cam shape which also works as a design restriction. The leaf spring 66 has a limit of work in terms of deflection that is defined by the maximum stress allowable and limit of fatigue for the material. The spring geometry, can be adjusted to suit, however there is a limitation of space and clearances for the installation that has to be considered alongside the kinematic mechanism.

As best shown in FIG. 6, a region of the end fitting 70 between the first and second end regions can define a relatively narrow waist region WR, where an outer surface of the end fitting is offset from a central axis of the end fitting less than a distance by which the contact surface of the cam follower is offset from the central axis. This can reduce the likelihood of the fouling between the end fitting 70 and the cardan pin 62 as the roller 72 moves along the cam surface 74.

Figure 8:
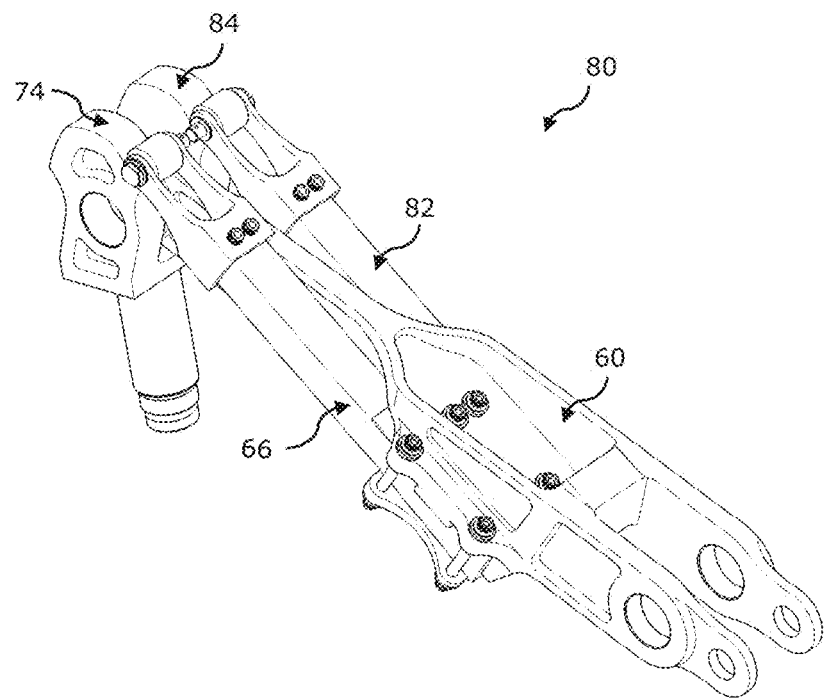
FIG. 8 is a diagram of a portion of a landing gear assembly according to an embodiment of the invention, having a pair of down-lock springs.

Referring now to FIG. 8, an aircraft landing gear assembly 80 according to a further embodiment of the invention is shown. The aircraft landing gear assembly 80 is identical to the aircraft landing gear assembly 50 of FIG. 4, except that it has a pair of spring and cam arrangements. More specifically, the aircraft landing gear assembly 80 comprises a second leaf spring 82 and a second cam surface 84. The leaf springs 66, 82 are mounted in parallel on the upper lock link element 60 and the cam surfaces 74, 84 are located in parallel, so as to define a symmetrical arrangement on either side of the longitudinal axis of the upper lock link element 60.

Figure 9:
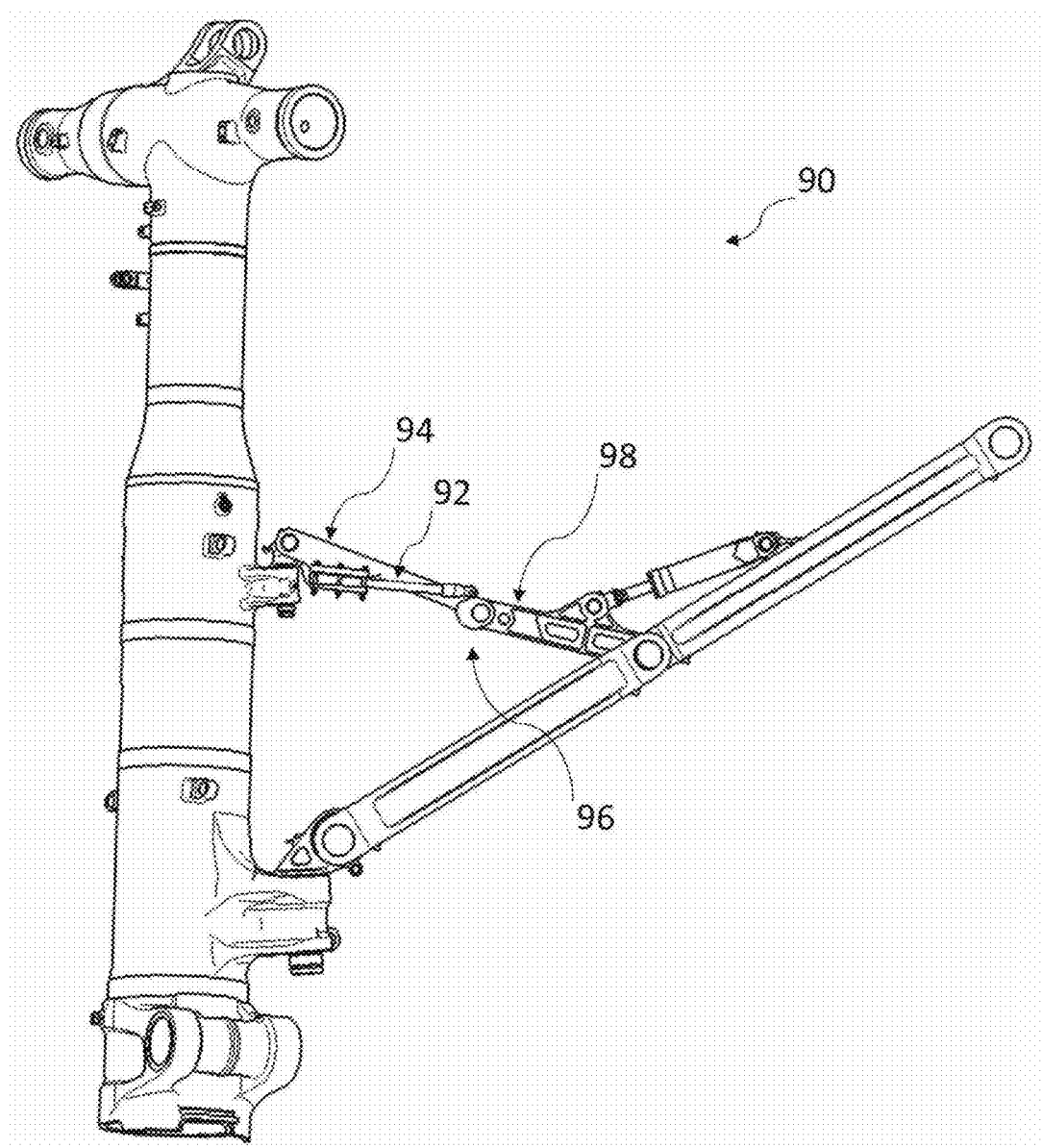
FIG. 9 is a diagram of a portion of a landing gear assembly according to an further embodiment of the invention.
Figure 10:
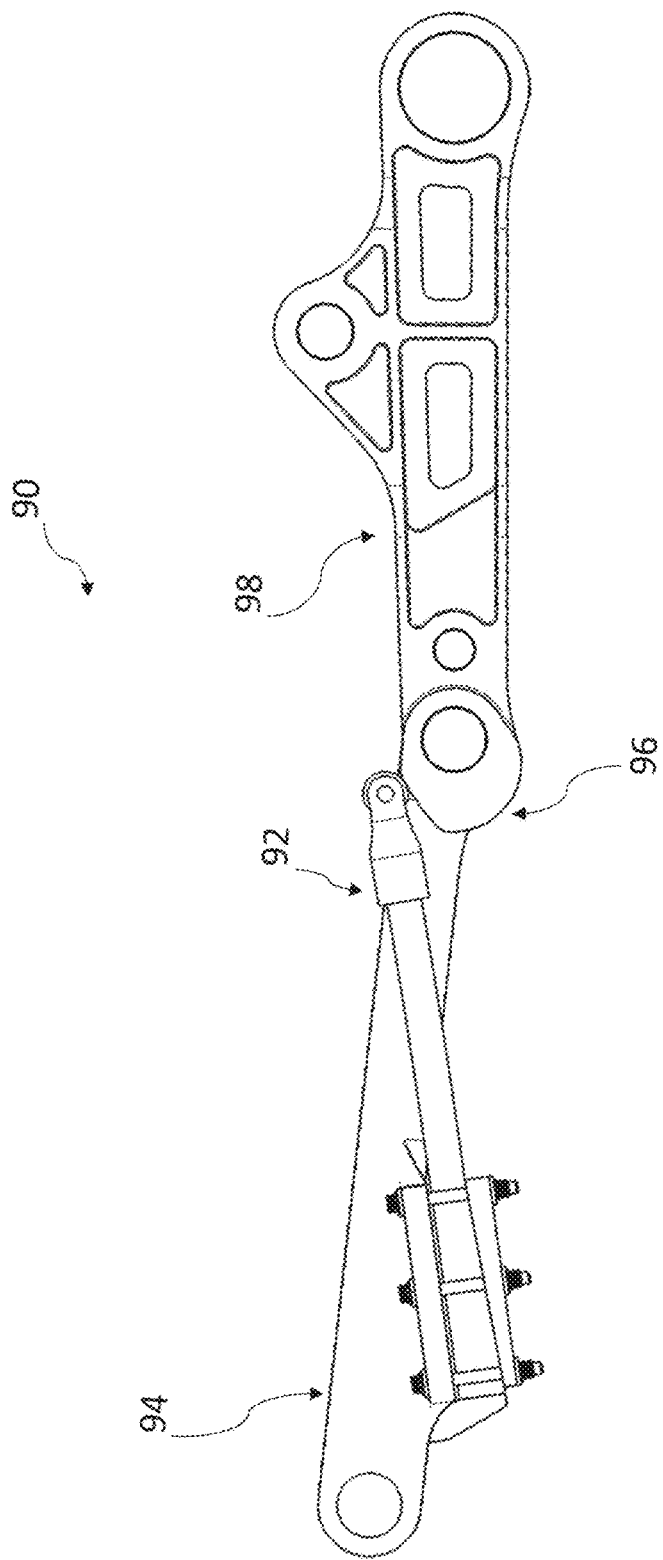

While the illustrated embodiments include a down-lock spring 66 mounted on the upper lock link member 60 and arranged to act on a cam surface 74 defined by the head of the cardan pin 62, in other embodiments a down-lock spring and cam arrangement according to the invention can be configured in different manners. For example, referring to FIGS. 9 and 10, a portion of a landing gear assembly according to a further embodiment is shown generally at 90. The landing gear assembly 90 is similar to the landing gear assembly 50 of FIG. 4 and for brevity the following description will focus on the differences. In this embodiment, the down-lock spring 92 is mounted on the upper lock link member 94 in an opposite direction so as to act upon a cam surface 96 defined by an end region of the lower lock link member 98. A plurality of springs can be provided as per FIG. 8.

In other embodiments, a leaf spring and cam arrangement according to the invention can be configured between different first and second elements, so as to serve other than a down-lock spring, such as an upper lock or 'up-lock' mechanism for holding a landing gear in a stowed condition, an assembly to assist the landing gear in retraction/extension or the steering mechanism, or an assembly forming part of a landing gear bay door.

In any embodiment, the leaf spring can be formed from any suitable material, such as a metallic material such as spring steel, or a composite material such as fibre reinforced polymer composite.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention can be implemented by means of hardware comprising several distinct elements. In a device claim enumerating several parts, several of these parts can be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
a first landing gear element movably coupled relative to a second landing gear element to pivot about a pivot axis;
a cam surface defined by the second landing gear element; and
a leaf spring having a first end region and a second end region, the first end region of the leaf spring being coupled to the first landing gear element to move with the first landing gear element and the second end region of the leaf spring comprising a cam follower arranged in moving contact with the cam surface such that the cam follower moves from a first region of the cam surface to a third region of the cam surface via a second region of the cam surface as the first landing gear element pivots about the pivot axis, wherein the cam surface is shaped such that a distance between the pivot axis and the cam surface increases between the first region and the second region and the distance between the pivot axis and the cam surface varies between the second region and the third region of the cam surface, and wherein the cam surface is non-linear between at least some of the first region, the second region and the third region.

2. The aircraft landing gear assembly according to claim 1, wherein the follower is defined by an end fitting coupled at the second end region of the leaf spring, the end fitting having a first end region defining a mounting formation via which the end fitting is coupled to the leaf spring.

3. The aircraft landing gear assembly according to claim 2, wherein the follower comprises a roller mounted on the end fitting to rotate about a roller axis which is parallel with the pivot axis of the first landing gear element.

4. The aircraft landing gear assembly according to claim 2, wherein the second end region of the end fitting defines the cam follower and wherein a region of the end fitting between the first and second end regions defines a waist region where an outer surface of the end fitting is offset from a central axis of the end fitting less than a distance by which the cam follower is offset from the central axis.

5. The aircraft landing gear assembly according to claim 1, wherein the third region of the cam surface is defined as an outwardly convex, curved surface.

6. The aircraft landing gear assembly according to claim 1, comprising a second leaf spring and a second cam surface, the second leaf spring having a first end region and a second end region, the first end region of the second leaf spring being coupled to the first landing gear element to move with the first landing gear element and the second end region of the second leaf spring comprising a second cam follower arranged in moving contact with the second cam surface, wherein the second cam surface is shaped such that a distance between the pivot axis and the second cam surface increases between the first region and the second region and a distance between the pivot axis and the cam surface varies between the second region and the third region of the second cam surface.

7. The aircraft landing gear assembly according to claim 6, wherein the leaf springs are mounted in parallel on the first landing gear element and the cam surfaces are located in parallel, so as to define a symmetrical arrangement on either side of the longitudinal axis of the first landing gear element.

8. The aircraft landing gear assembly according to claim 1, wherein the leaf spring comprises a fibre composite leaf spring.

9. An aircraft landing gear assembly comprising:
a first landing gear element movably coupled relative to a second landing gear element to pivot about a pivot axis;
a cam surface defined by the second landing gear element; and
a leaf spring having a first end region and a second end region, the first end region of the leaf spring being coupled to the first landing gear element to move with the first landing gear element and the second end region of the leaf spring comprising a cam follower arranged in moving contact with the cam surface such that the cam follower moves from a first region of the cam surface to a third region of the cam surface via a second region of the cam surface as the first landing gear element pivots about the pivot axis, wherein the cam surface is shaped such that a distance between the pivot axis and the cam surface increases between the first region and the second region and the distance between the pivot axis and the cam surface varies between the second region and the third region of the cam surface, and wherein the cam surface includes one or more curved regions which cause the distance between the pivot axis and the cam surface to increase between the first region and the second region and cause the distance between the pivot axis and the cam surface to vary between the second region and the third region.

10. An aircraft landing gear assembly comprising:
a first landing gear element movably coupled relative to a second landing gear element to pivot about a pivot axis;
a cam surface defined by the second landing gear element; and
a leaf spring having a first end region and a second end region, the first end region of the leaf spring being coupled to the first landing gear element to move with the first landing gear element and the second end region of the leaf spring comprising a cam follower arranged in moving contact with the cam surface such that the cam follower moves from a first region of the cam surface to a third region of the cam surface via a second region of the cam surface as the first landing gear element pivots about the pivot axis, wherein the cam surface is shaped such that a distance between the pivot axis and the cam surface increases between the first region and the second region and the distance between the pivot axis and the cam surface varies between the second region and the third region of the cam surface, and wherein the cam surface is not a side of a lock link.

* * * * *